United States Patent [19]

Schwaertzel et al.

[11] Patent Number: 4,535,441
[45] Date of Patent: Aug. 13, 1985

[54] COMMUNICATION SYSTEM FOR STATIONARY AND MOBILE SUBSCRIBERS

[75] Inventors: Heinz Schwaertzel; Hans Unterberger, both of Munich, Fed. Rep. of Germany

[73] Assignee: Siemens Aktiengesellschaft, Berlin & Munich, Fed. Rep. of Germany

[21] Appl. No.: 61,899

[22] Filed: Jul. 30, 1979

[30] Foreign Application Priority Data

Sep. 29, 1978 [DE] Fed. Rep. of Germany ....... 2842632

[51] Int. Cl.³ .............................................. H04B 9/00
[52] U.S. Cl. ..................................... 370/4; 179/2 EB; 455/53; 455/54; 455/600; 455/612
[58] Field of Search .......................... 370/4, 91, 92, 93; 455/53, 54, 600, 612; 179/2 EA, 2 EB, 2 TV

[56] References Cited

U.S. PATENT DOCUMENTS

| Re. 29,183 | 4/1977  | Greneker, III  | 179/2 EA |
|------------|---------|----------------|----------|
| 3,226,484  | 12/1965 | James          | 179/2 TV |
| 3,609,246  | 9/1971  | Muller         | 179/2 EB |
| 3,803,405  | 4/1974  | Ohnsorge et al.| 370/4    |
| 4,101,835  | 7/1978  | Taylor et al.  | 179/2 EB |

OTHER PUBLICATIONS

Siemens Publication-Personensuchernrichtungen, Publication #N 157/1385, pp. 1-8.

*Primary Examiner*—Joseph A. Orsino, Jr.
*Attorney, Agent, or Firm*—Hill, Van Santen, Steadman & Simpson

[57] ABSTRACT

A communication system for stationary and mobile subscribers includes a number of subscriber stations interconnected in a ring circuit and adapted for two-way communication with other subscriber stations, via a ring circuit. A transceiver station is also connected into the ring circuit and is adapted for two-way communication with the ring, and for two-way wireless communication with mobile subscriber stations, and serves to interconnect the mobile stations for two-way communication with the stations connected with the ring. Each of the subscriber stations of the ring circuit are connected by conventional means with a telephone switching network, and a call directed to such a station is selectively switched to the ring for communication with a mobile station having the same address or identification as the called station. The ring comprises a transmission line in which plural channels are transmitted by time division multiplex, with each station having access to every channel, and adapted to transmit and receive one information block per multiplex frame. The information block contains an address or identification of the called station so that information can be extracted from the multiplex transmission only by the station set having a corresponding address. The ring transmission line may be formed as a light wave guide, and is adapted for use with small, as well as for large systems.

8 Claims, 3 Drawing Figures 4,535,441

COMMUNICATION SYSTEM FOR STATIONARY AND MOBILE SUBSCRIBERS

FIELD OF THE INVENTION

The present invention relates to a communication system for stationary and mobile subscribers, and more particularly to a communication system in which communication is facilitated with a mobile station having the same address as a fixed station

THE PRIOR ART

In communication systems, it is important that a subscriber who is being called be provided with apparatus for receiving the call, and for carrying on two-way communication with the calling party. While the subscriber is in the proximity of his telephone set, meeting this requirement is not difficult. When the subscriber is away from his telephone set, the problem becomes more difficult, and there have been attempts in the past to solve this problem by the use of so-called "personal paging devices" which are designed to let the subscriber know that a calling party is attempting to reach him. Such personal paging devices cannot, however, allow the subscriber to enter into two-way communication with the calling party, and do not provide the subscriber with any information other than that he is being called. He must then initiate communication with the calling party by finding a telephone set and calling a prearranged address or number. Such personal paging devices are described in the literature, for example, in the Siemens publication Personensuchernrichtungen, Publication No. N 157/1385. It is frequently inconvenient for a subscriber to locate a telephone set in a remote vicinity, especially when he is engaged in an important activity which cannot be interrupted.

BRIEF SUMMARY OF THE PRESENT INVENTION

It is a principal object of the present invention to avoid the disadvantages inherent in the use of paging systems.

Another object of the present invention is to provide apparatus for making possible the switching of a normal subscriber connection from a stationary to a mobile operation, to allow a called subscriber at a mobile location to carry on a two-way conversation with a calling party.

In accordance with one embodiment of the present invention, a ring circuit is employed for interconnecting a plurality of subscriber stations with a transceiver station adapted for communicating with mobile stations, whereby a calling party seeking to reach a station connected in the ring circuit, can carry on two-way communication with the mobile station by way of the transceiver station. By the use of this invention, only one transceiver station is required for all of the telephone sets in the ring circuit, and individual transceivers are not required for the fixed subscriber stations.

BRIEF DESCRIPTION OF THE DRAWINGS

Reference will now be made to the accompanying drawings in which.

DESCRIPTION OF THE PREFERRED EMBODIMENT

Figure 1:
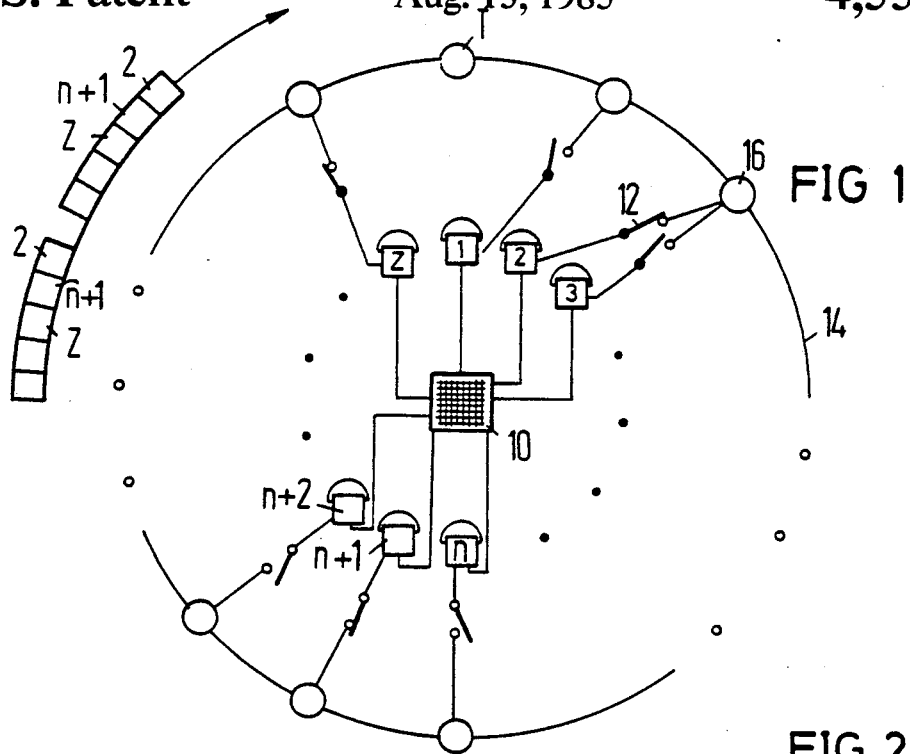
FIG. 1 is a diagrammatic illustration of a preferred embodiment of the present invention, incorporating a plurality of subscriber stations and a single transceiver station.

Referring to FIG. 1, a plurality of subscriber stations 1, 2, 3 . . . N, N+1, N+2 . . . are illustrated, each of which has a conventional telephone set connected with a switching system 10. The switching system 10 is a conventional telephone network, by which the various subscriber stations may be interconnected in a conventional way. The apparatus of FIG. 1 also includes a terminal station Z, which is also interconnected with the switching system 10. The terminal station Z represents any terminal device, such as facsimile equipment or the like, which employs telephone transmission lines. Each of the subscriber stations is connected by means of a switch such as a switch 12, to a ring circuit 14 via a junction unit 16. The ring incorporates a transceiver station T for communicating with mobile subscriber stations. In accordance with the present invention, the address or identification of each mobile station is the same as one of the fixed subscriber stations 1, 2, 3, etc.

Two or more of the subscriber stations may share the same junction unit. For example, subscriber stations 2 and 3 both share the junction unit 16, and each has an individual switch interconnected with such junction.

In operation, a calling party having access to the switching network 10, places a call to one of the subscriber stations such as subscriber station 2. If the called subscriber is at his station, the call is received in the conventional manner, and two-way communication is carried out with the calling party in the conventional way through the network 10. If the subscriber is away from the location of his subscriber station, however, he closes the switch 12, which allows the subscriber station 2 to forward the incoming message from the calling party to the ring 14. The transceiver T receives information from the ring, passed through the subscriber station 2, and transmits it to a mobile station having the same identification as the subscriber station 2. The subscriber present at the mobile station No. 2 can receive the call and can carry on two-way communication with the calling party. Information originating with the called party is transmitted to the transceiver station T, which passes it over the ring 14 to the subscriber station 2, from which it is forwarded to the calling party. Thus, a normal two-way communication is possible between a calling party and subscriber No. 2, even though he is not physically present at his subscriber station.

Preferably, communication between the various subscriber stations and the transceiver station T is carried out over the ring 14 by means of time multiplexing. This is illustrated diagrammatically at the left-hand portion of FIG. 1, in which two successive multiplex frames are illustrated. Each frame has a plurality of blocks, and each block contains information originating with, or destined for, any of the subscriber stations. In the example shown, the first block contains information to or from subscriber station 2, the next subscriber station N+1, and the next the terminal Z.

The communication flow along the ring 14 is unidirectional, clockwise as illustrated in FIG. 1, so there is a separation between outgoing and incoming messages for each station. During each frame, the incoming message is received at a subscriber station, and the outgoing message is inserted into a subsequent vacant time slot.

Figure 2:
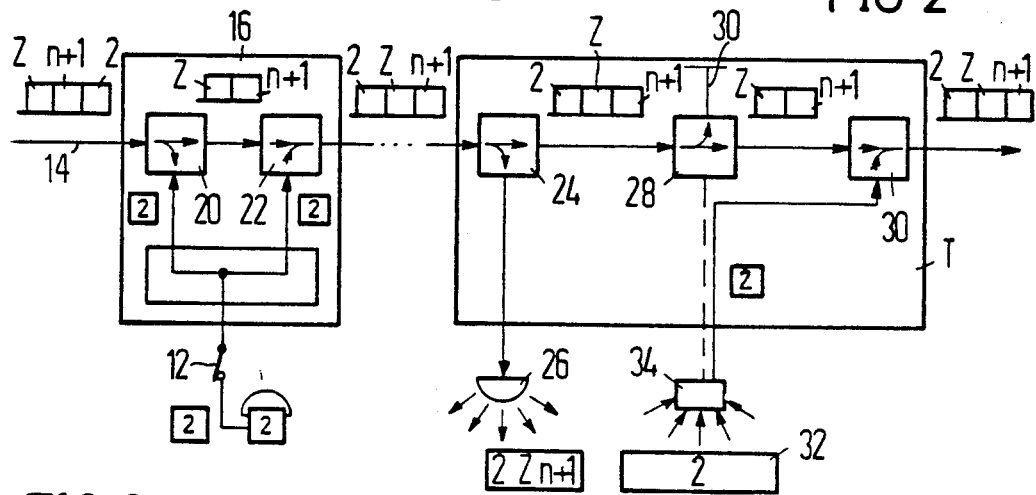
FIG. 2 is a functional block diagram of apparatus employed at one of the stations, and the transceiver station.

FIG. 2 illustrates an aspect of the present invention in more detail. A specific time slot is not provided for each subscriber station, because to do so would require relatively expensive apparatus, and most of the time, many time slots would not be in use. Accordingly, the present invention provides fewer time slots than there are subscriber stations, and each subscriber station can have access to any vacant time slot within each frame. Vacant time slots can either be identified by means of information at the beginning of each frame or by examining the blocks within the frame. When all the time slots are occupied, a subsequent call is placed on a waiting or hold status, or may be given a busy signal or other signal indicating that the called party cannot be reached at that time.

Each block containing data to or from a subscriber unit, contains, preferably at its beginning, an identification of the called subscriber station, which substantially avoids problems in synchronizing operation of the various devices. The need for synchronization of the subscriber stations with the multiplexing operation is avoided because each subscriber station, in recognizing its address at the beginning of a block, is adapted to receive the incoming message in that block, thus clearing it, and to insert an outgoing message in a later time slot. The beginning of a frame is identified with a frame start identification, so that special steps to insure synchronization with the frame repetition rate are not required.

Referring to FIG. 2, a functional block diagram illustrates apparatus located at subscriber station No. 2, and at the transceiver stations. The junction unit 16 associated with terminal 2 incorporates a pair of switching devices 20 and 22, which are inserted in series with the ring 14, at its input and output terminals. The switching devices 20 and 22 may be set so as to provide a direct connection between the input and output terminals of the junction unit 16. Alternatively, the switching devices 20 and 22 may be set to allow two-way communication with the telephone set at the subscriber location 2 through the switch 12. Preferably, means (not shown) is provided for recognizing an incoming message for the station No. 2, and for operating the switching device 20 to pass that message to the telephone set at that station, and in the process, clear that time slot from the ring at the output of the junction unit 16. Then other means (not shown) recognizes the occurrence of an empty time slot and operates the switching device 22 to allow an outgoing message from station No. 2 to occupy that time slot. This operation is illustrated diagrammatically in FIG. 2 by three successive time slots which are illustrated on the ring 14, before the input of the junction unit 16 is reached, containing data blocks 2, N+1, and Z, in that order. These correspond to the stations of FIG. 1 which have their ring-connecting switches closed. The switching device 20 recognizes the occurrence of a block containing the identification of subscriber station No. 2, and switches the path for this block downwardly to subscriber station No. 2, clearing this time slot in the ring. Succeeding blocks are switched to proceed directly to the switching device 22.

As illustrated in FIG. 2, the block destined for subscriber station No. 2 has been removed from the ring, so that, between the switching devices 20 and 22, only data blocks corresponding to N+1 and Z are present.

The switching device 22 recognizes an empty time slot following the data block Z, and changes its state to allow the subscriber station 2 to insert an outgoing message in the time slot following data block Z. Accordingly, at the output of the junction 16, the data blocks on the ring 14 are in the order N+1, Z and 2.

The next unit illustrated in FIG. 2 is the transceiver station T which has a switching device 24, which is adapted to recognize every non-vacant time slot and transmit the data blocks to a transmitter unit 26, from which they are transmitted to all mobile units. The switching device 24 prevents the transmission of empty data blocks. All of the data blocks arriving at the switching device 24 are also connected directly to the next switching device 28. The switching device 28 is adapted to clear data blocks containing addresses of mobile units which are transmitting, by switching such blocks to a sink over a line 30. As shown in FIG. 2, the three data blocks originating with the junction unit 16 pass by the switching device 24 unchanged, but the switching device 28 removes the data block corresponding to subscriber station No. 2 from the ring circuit, because the mobile unit No. 2 is recognized by the receiver unit 34 to be transmitting, and the receiver controls operation of the switching device 28 via a control line 35.

The mobile unit corresponding to subscriber station No. 2 is illustrated diagrammatically in FIG. 2 as a block 32, and its transmitted signal is received by the receiver 34, and communicated to a switching device 30. The switching device 30 is connected to the switching device 28, and is adapted to pass the blocks N+1 and Z from the switching device 28, and to insert the data block originating with the mobile subscriber station No. 2 into the empty time slot following the block Z. Its construction and operation is the same as the switching device 22.

The switching devices 20, 22, 24, 28 and 30 are compatible to those used for time division multiplex switching as for instance described in B. Schaffer, "IEEE Conference on Communications, " 1972, Conference Record, pgs. 5-13 to 5-18.

It will be appreciated from the above description, that the other subscriber stations such as 1, 3, N, etc. all function in the same way, to receive messages from the ring 14 and to return messages to the ring so as to carry out two-way communication.

Figure 3:
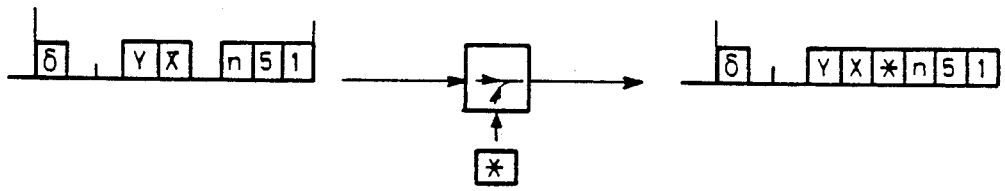
FIG. 3 is a diagrammatic illustration of the manner in which information from a station may be inserted in any empty channel of a plural channel time multiplex communication system.

The subscriber stations of the present invention can initiate calls to other subscriber stations and establish a two-way communication by way of the ring 14, independently of the switching network 10. Mobile subscriber stations may also originate calls and be connected by means of the present invention for two-way communication with other fixed or mobile subscriber stations. When information originates from a mobile station, a data block addressed to the called subscriber station is inserted in the first available time slot within each frame. FIG. 3 illustrates an example of this, in which a message originating from a station identified by a star in FIG. 3, is inserted into the first available time slot, which in the example of FIG. 3 is after data block N and before data block X.

The ring 14 may be an electrical transmission line, but an optical transmission line can also be employed, using visible or infrared radiation.

It is apparent that when the present invention is used in conjunction with the telephone network, the telephone network itself remains completely unchanged. The additional manual control required is the switch 12, by which the individual subscriber stations may be connected to the ring 14. No modification of the telephone switching network per se is required.

The apparatus for carrying on the multiplexing operation of the present invention is not illustrated or described in detail, because conventional time division multiplex systems may be employed, the details of which are familiar to those skilled in the art. Similarly, the details of construction of the switching devices 20, 22, 24, 28 and 36 also need not be described in detail, since suitable devices are known in the art. In similar fashion, the transmitter 26 and the receiver 34 are also conventional units familiar to those skilled in the art.

It will be apparent that various additions and modifications may be made in the apparatus of the present invention without departing from the essential features of novelty thereof, which are intended to be defined and secured by the appended claims.

What is claimed is:

1. A communication system for stationary and mobile subscribers, comprising; a ring circuit for interconnecting a plurality of subscriber stations having input-output devices, a switch located at each subscriber station for selectively interconnecting said station with said ring circuit, said subscriber stations also being interconnected by means of a conventional switching network, a transceiver station connected to said ring circuit, said transceiver station having a transmitter and a receiver for carrying on two-way communication with a mobile subscriber terminal device; whereby a call to a subscriber is switched onto the ring circuit via said switch at the subscriber's station and is transmitted wirelessly with an address allocated to the called subscriber, which call is received by a mobile subscriber terminal device corresponding to said address; and whereby two-way communication may be carried out between the subscriber and the originator of said call.

2. The communication system according to claim 1, wherein said ring circuit is an electric transmission line.

3. The communication system according to claim 1, wherein the wireless information exchange between the mobile subscriber terminal device and the ring circuit is carried out by means of radio transmission.

4. The communication system according to claim 1, wherein said ring circuit is an optical transmission line.

5. The communication system according to claim 1, wherein the wireless information exchange between the mobile subscriber terminal device and the ring circuit is carried out by means of infrared transmission.

6. The communication system according to claim 1, wherein the information exchange between subscriber stations via said ring circuit is carried out by time-division multiplex, with each multiplex information block having the address of the called subscriber.

7. The communication system according to claim 6, wherein said time-division multiplex transmits information in sequential frames, and including a fixed identification in each said frame, whereby synchronization for the multiplex system is omitted.

8. The communication system according to claim 1, wherein said mobile subscriber terminal device is permanently associated with a stationary subscriber station.

* * * * *